United States Patent

Brooks

[15] 3,674,939

[45] July 4, 1972

[54] BASEBAND PULSE CODE MODULATION SYSTEM

[72] Inventor: Fred A. Brooks, 5 Emerson Gardens, Lexington, Mass. 02173

[22] Filed: Nov. 26, 1969

[21] Appl. No.: 879,999

[52] U.S. Cl. .................................... 179/15.55 R, 179/15 BC

[51] Int. Cl. .................................... H04b 1/66

[58] Field of Search ................179/1 SA, 15.55 R, 15.55 TC, 179/15 BC, 15 BM; 324/85

[56] References Cited

UNITED STATES PATENTS

| | | | |
|---|---|---|---|
| 1,773,126 | 8/1930 | Affel | 179/15.55 |
| 3,089,921 | 5/1963 | Hines | 179/15 OR |
| 3,311,442 | 3/1967 | Jager | 179/150 OR |
| 1,948,973 | 2/1934 | Steinberg | 179/1 SA |
| 3,134,855 | 5/1964 | Chasek | 179/15 OR |
| 3,337,691 | 8/1967 | Litchman | 179/15 BM |

*Primary Examiner*—Kathleen H. Claffy
*Assistant Examiner*—Jon Bradford Leaheey
*Attorney*—Harry A. Herbert, Jr. and Julian L. Siegel

[57] ABSTRACT

Pulse code modulation system for reducing bandwidth in which voice signal input is compressed, limited, filtered into frequency channels, all of which are converted to the same baseband frequency and are fed to a time sharing multiplexing circuit followed by an analog to digital circuit for transmission. The digital signal is received, converted to analog, demultiplexed, demodulated to voice frequency channels and bandpass filtered. The number of channels applied to the time sharing circuit can be reduced by common band occupancy quadrature carrier methods and then converted to baseband.

2 Claims, 4 Drawing Figures

INVENTOR.
FRED A. BROOKS
BY Harry A. Herbert Jr and Julian L. Siegel
ATTORNE

INVENTOR.
FRED A. BROOKS
BY Harry A. Herbert Jr. and Julian L. Siegel
ATTORNEYS

INVENTOR.
FRED A. BROOKS
BY Harry A. Herbert Jr.
Julian L. Siegel
ATTORNEYS

INVENTOR.
FRED A. BROOKS
BY Harry A. Herbert Jr. and
Julian L. Siegel
ATTORNEYS

BASEBAND PULSE CODE MODULATION SYSTEM

BACKGROUND OF THE INVENTION

This invention relates to pulse code modulation systems, and more particularly to a system for reducing the bandwidth for voice communication.

In voice communication circuits, an analog signal voltage generated in response to sound pressures from a talker are transmitted from talker to listener over voice or carrier transmission circuits. For secure communication, the analog voltage after conversion to pulse code modulation may be combined directly with an analog key or the signal may be converted into digits and combined with a digital key before transmission.

In analog to digital conversion, the highest frequency in the signal to be transmitted determines the sampling rate. The maximum plus or minus voltages to be reproduced determines the number of bits required to represent the voltage sample or character. The noise in the reproduced channel is related to one-half the minimum change represented by a character. The product of the first two factors gives the bit rate required to transfer the signal voltage information. Normal voice quality communication circuits are reproduced in a band from 200 to 3,000 cycles, and may have a maximum plus or minus voltage range of up to 2,000:1 or 66 db. This wide range can be divided into two parts which require different sampling rates to reproduce the signal information. First, the frequency and voltage range required to reproduce the information in the voice signal of a constant volume talker and second, the voltage difference between weak and strong talkers. It has been determined that a single constant volume talker is reproduced satisfactorily by using a three or four bit character, 8–16 discrete steps or 18– 24 db of voltage range. This leaves 42 db range for the difference between talkers including peak voltages. The measured volume range is 34 db. The mean volume is of 15.5 vu, the average power talker is 12.5 vu, and the peak voltages may exceed the mean power by about 18 db either plus or minus peaks 0.1 percent of time. Thus, a 36 db range will reproduce an average power talker.

It has been shown that articulation, intelligibility and voice quality are unaffected by applying reasonable peak limiting to the signal voltage. If 8 db of peak limiting were applied to both plus and minus peaks, the remaining range is reduced to 20 db. This range converted to digits require a character of less than four bits to represent the peak limited signal. A four bit character may be required to meet the channel signal to noise requirement.

The difference in mean volume between weak and strong talkers of 34 vu can be reduced by using compression amplifiers, vogads, regulators, or any combination of these means. A reduction in volume range of 10:1 can readily be obtained which leaves 34/10 or about 4 db of uncompensated variation. This variation can be reduced further by compression or the variation can be added to the normal peak voice signal range thereby requiring a total range of about 24 db which can be digitized with a four bit character. However, experimental results as stated above indicate that a three or four bit character is required. With a sampling rate of twice the highest voice frequency to be reproduced or 6.0 kilocycles and a 4 bit character, 24.0 kilobits are required to transmit a voice quality signal. A lower sampling rate can be used if the highest frequency component were transmitted at a lower frequency. The frequencies transmitted can be shifted by dividing the full signal band into sub-bands and modulating the resulting sub-bands to baseband frequencies. It has been shown that one half the voice band can be omitted if the remainder of the voice signal is distributed over the full frequency band. The selected reduced band arrangement gave the same articulation performance under test.

SUMMARY OF THE INVENTION

The number of binary bits required to convey the entire signal information contained in an applied analog voice signal is determined by the range of frequency and maximum voltage from the signal. Information contained in the signal can be considered in two parts. The first part is the desired information which is required for a listener to interpret the message and second, the signal variations which do not contribute to the listener's ability to get the message. This latter information which consists of differences between talkers and high peak voltages can be removed without materially degrading the transmission of the desired information.

The desired information is encoded or put into a suitable form for transmission. The number of bits required to send the useful information is then smaller and a reduced bandwidth can be used to transmit the signal to the listener's ear.

Information contained in an analog signal from a random talker has a mean power, peak voltages above the mean voltage and a frequency content which must be reproduced in order to transmit a satisfactory signal to the distant listener's ear. The difference in mean power between weak and strong talkers is about 34 db.

Mean power changes when the talker changes or the user raises or lowers his volume. The change is very slow compared to the highest frequency of the voice signal. The difference in volume between talkers need not be reproduced at the listener's ear, as listeners have a preferred listening volume and this information does not contribute materially to the signal message. The quality of the voice signal which is reproduced from the information content will include the effects of change of emphasis. Peak voltages are present in the applied analog voice signal which are much higher than the mean voltage allowing a portion of peak voltages which exceed a limiter threshold to be removed before encoding.

The transmission circuits include a volume compressor, a peak limiter set to remove unnecessarily high peaks, and filters to select and divide the signal band into separate bands. A minimum bandwidth made up of selected bands distributed over the nominal voice band is used to transmit the signal information. Modulators with appropriate carriers are included to reduce each of the individual channels to baseband frequencies and the selected signals are encoded and transmitted to the receiver over digital circuits. When the processed analog signal is converted to a digital stream or streams, the total number of bits required per voice circuit is reduced.

The number of bands transmitted can be reduced by combining the baseband signals of different frequencies into the same band by modulating the information onto orthogonal carriers. The sampling information will contain information on two double sideband signals but present on orthogonal carriers. This reduces the number of bands which must be transmitted and may reduce the bits required. Conferencing is accomplished as in ordinary analog circuits with due regard to the nature of the transmission.

It is therefore an object of the invention to provide a pulse code modulation system for voice communication using a reduced bandwidth.

It is another object of the invention to provide a system for economical encoding of speech signals into a single channel analog transmission circuit.

It is another object to provide a transmission system that has improved signal to noise ratio.

It is still another object to provide a pulse code modulation system that reduces the number of switches at switching stations.

It is still another object to provide a pulse code modulation system providing full four wire duplex conferencing.

These and other advantages, features and objects of the invention will become more apparent from the following description taken in connection with the illustrative embodiment in the accompanying drawings, wherein:

DETAILED DESCRIPTION OF THE PREFERRED EMBODIMENT

Figure 1:
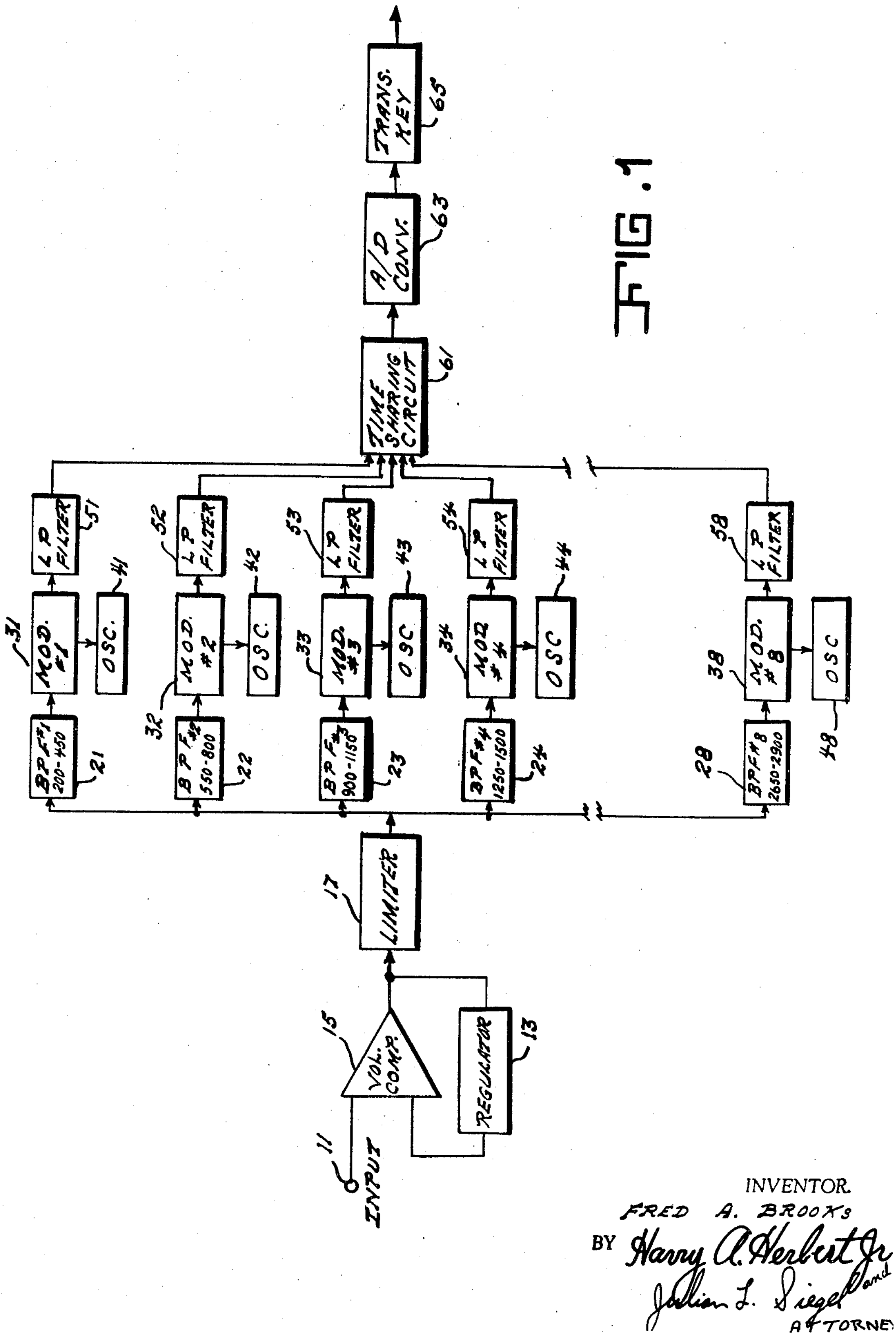
FIG. 1 is a block diagram showing the encoding and transmitting portion of an embodiment of the invention.

Referring to FIG. 1, voice signals from a normal voice are applied to input 11 which can represent a four wire system. The applied signal is regulated to nearly constant volume by regulator 13 and volume compressor amplifier 15. The signal is then peak limited by limiter 17 to remove unnecessarily high peaks and is applied to a bank of eight bandpass filters, as an example, the filters having a pass band of 250 cycles with a total of 350 cycles separation between adjacent bands. The regulated peak limited voice signals are applied to eight bandpass filters 21–28 in parallel and the output of each filter then contains those components of signal frequency which lie within the passband. Each sub-band output is modulated in modulators 31–38 with a different fixed frequency from oscillators 41–48 to reduce all bands to the baseband. The baseband is that band that starts with DC and extends to the frequency of the bandwidth of the filter. The selected bands, which in total except for the guard band, represent the original analog signal, are filtered in low pass filters 51–58 and are transmitted as channels of time division multiplex system 61. Each sub-band is sampled at twice the highest pass band frequency of 250 cycles or 500 cycles and can be transmitted as amplitude modulated signals or over a time shared voice channel and converted into quantized digital form using analog digital converter 63. With the signal components divided into sub-bands which are transmitted in a time shared channel effectively in parallel at baseband, the sampling rate is reduced in the ratio of the top frequencies of the respective bands or 12:1. However, if the entire band were required and the same number of bits in each character were used, the number of bits per second would be unchanged. The number, spacing of bands and the number of bits in the character can be changed to reduce the bit rate.

The amplitude of the applied analog signal in each band is reduced by dividing the signal voltage into separate channels. If the individual sub-band signals are in phase and of equal energy, then each channel voltage will add directly to the voltages from adjacent channels. Thus, the total signal will be made up of the sum of sub-band voltages, which will effectively reduce the size of the voltage step and character since each individual channel signal change contributes to the total output. The noise due to random one half step in each channel adds in quadrature. A four bit character may be required for the whole voice band, but when the signal is divided into sub-bands, an equivalent step can be used. The character can be 16/8 or 2.0 steps or a single character would suffice. If a one bit character is used the total bits required is $500 \times 1 \times 8 = 4000$ bits. The actual sub-channel voltage and range will depend upon the energy frequency distribution of talkers.

A channel regulator can be added in the analog to digital converter 63 to maintain the mean signal voltage in the middle of the available range. The output of each baseband channel is sampled at a 500 cycle rate. The sampled voltage relative to the mean of the range of voltage provided in the analog to digital converter is coded into a character which represents the measured amplitude. The digits from all baseband channels are generated serially and combined with an encipher key 65 if desired for transmission.

Figure 2:
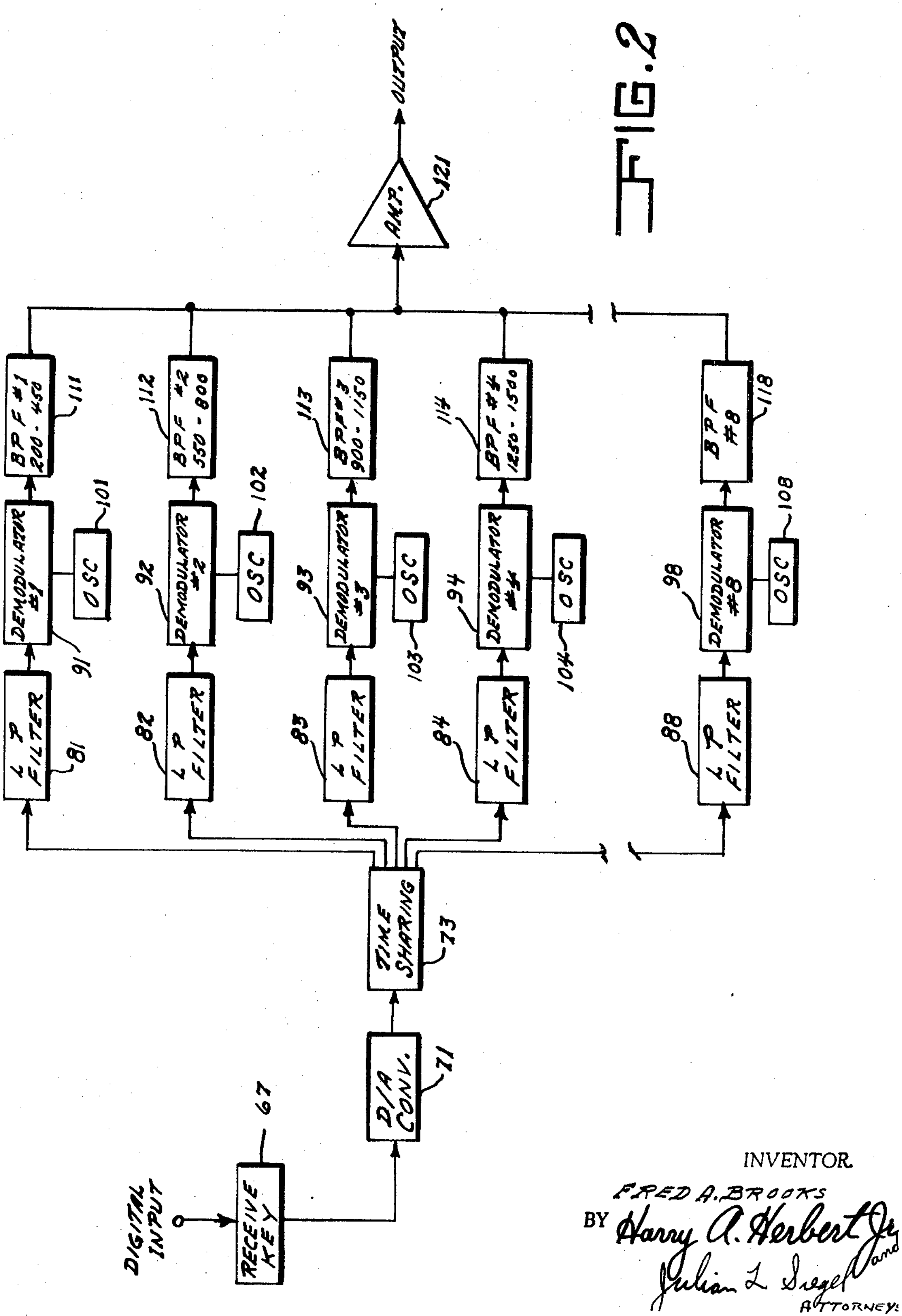
FIG. 2 is a block diagram showing the receiving and decoding portion of the same embodiment of the invention as that shown in FIG. 1.

Referring to FIG. 2, the distant terminal key 67 is removed to recover the original bit stream which is converted into analog voltage by the digital to analog converter 71 and distributed to the proper channel of the receiving by time division demultiplexer 73. In the channel circuits the recovered baseband signal is fed to low pass filters 81–88 and is demodulated by demodulators 91–98 and oscillators 101–108 in order to recover the voice spectrum. The restored bands at original frequencies are combined in eight band pass receiving filters 111–118 and fed to the listener subset at the desired listener volume which can be controlled by amplifier 121.

Figure 3:
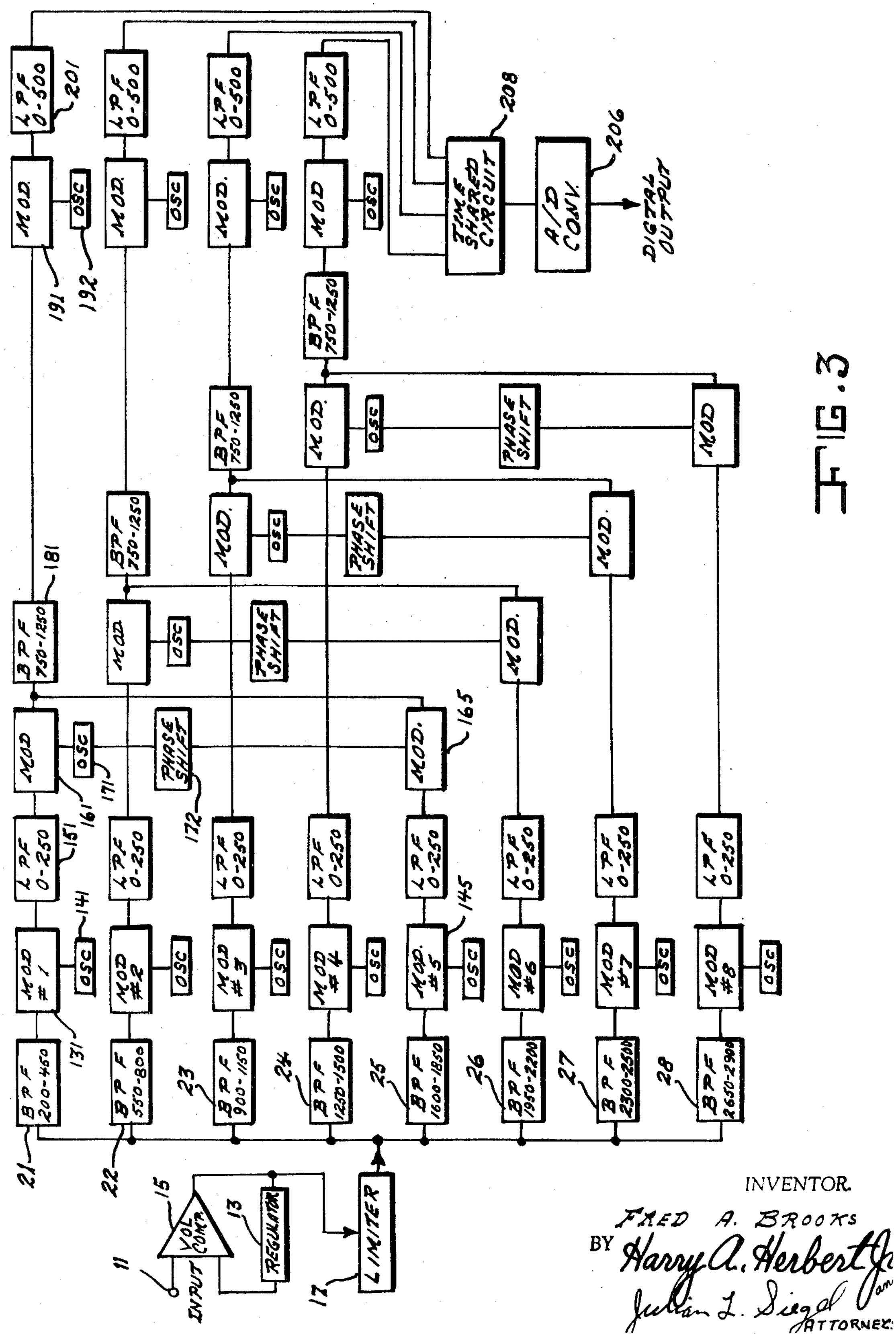
FIG. 3 is a block diagram of the encoding and transmitting portion of an orthogonal embodiment of the invention.
Figure 4:
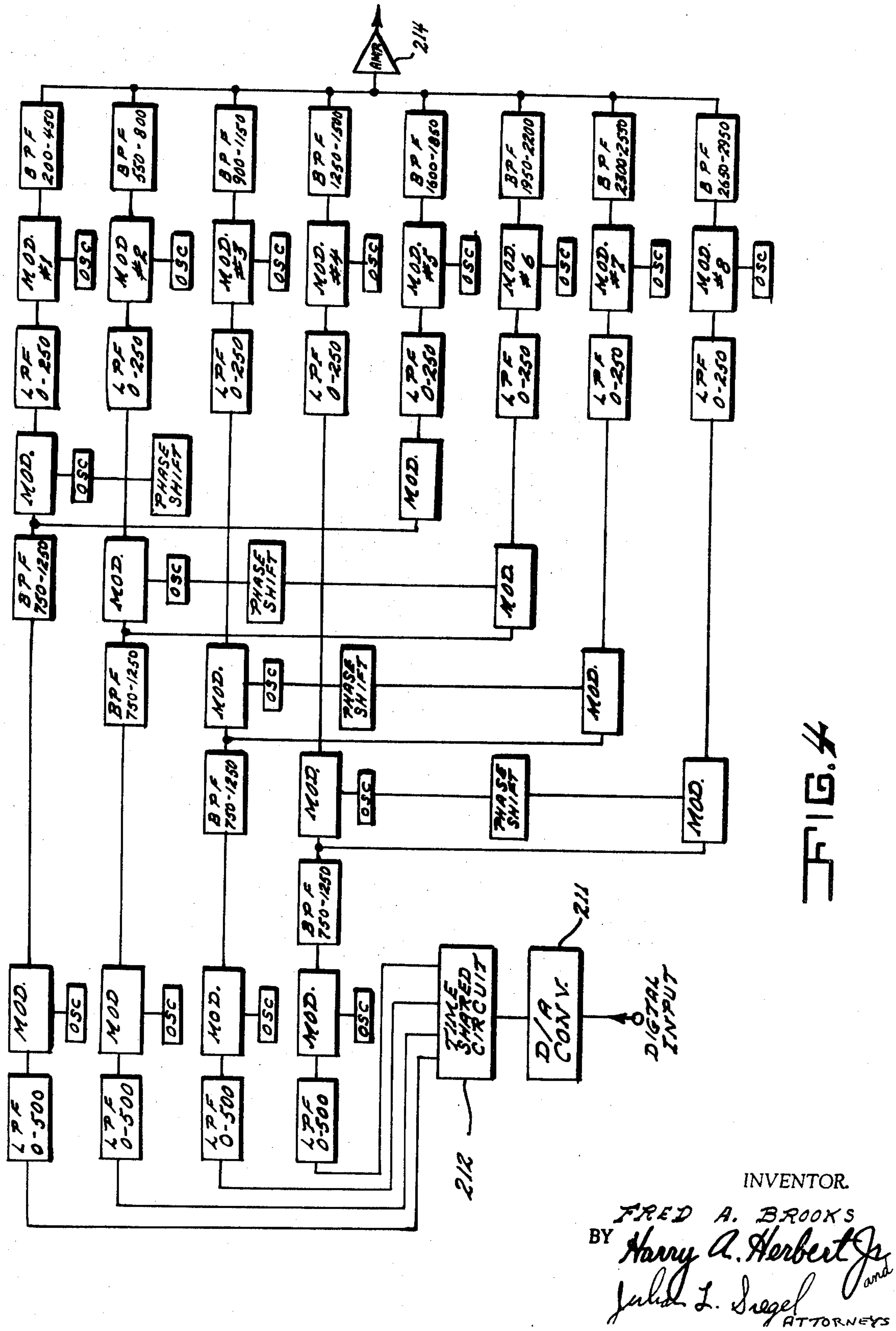
FIG. 4 is a block diagram of the decoding and receiving portion of the orthogonal embodiment.

A system for combining two sub-bands of different informational content to form a common band occupancy by quadrature carrier method is shown in FIGS. 3 and 4. As explained before, the voice input 11 is fed to compressor 15, regulator 13, and limiter 17 and then is divided into sub-bands by band pass filters 21–28. The output from band pass filter 21, for example, is the sub-band from 200 to 450 cycles, and is modulated in the first modulator designated as 131 against a 200 cycle carrier from oscillator 141 in double balance carrier suppression modulator to produce a baseband output at 0 to 250 cycles, and is then fed to low pass filter 151. The output of companion sub-band number 5 from modulator 145 is modulated against a 1,600 cycle carrier to also produce a 0 to 250 cycle baseband signal. Those signals are then modulated in modulators 161 and 165 against the quadrature carrier phase of a carrier formed by oscillator 171 with phase shifter 172 to generate a carrier and sidebands. The double side band signal of the first and fifth sub-bands following band pass filter 181 are applied to double balance modulator 191 together with the signal from oscillator 192 for translation to the baseband. The signal fed to low pass filter 201 is regulated and converted to digital form for transmission in analog to digital converter 206. All other sub-channel signals are similarly processed for transmission using the respective modulators, oscillators, and filters shown in FIG. 3. The output of the reduced number of channels is time shared on a common digital transmission channel by time shared multiplexing circuit 208 and the digital output of all baseband channels is combined with a key generator, if required, and the combined signal is transmitted over the data circuit to the distant terminal where the key is removed.

The digital stream as shown in FIG. 4 is applied to digital to analog converter 211. The recovered analog voltages are distributed by a 500 cycle synchronous carrier by time sharing demultiplexer 212 to the appropriate baseband channel and to the original frequency using appropriate modulators, filters and oscillators as shown in FIG. 4. The order in which the sub-bands are formed from the received signal is the reverse order of that which was explained in the transmitter portion. The ultimate voice signal is available at the output of amplifier 12.

With dual baseband channels modulated on 90° carriers, the number of sub-channels is one half the number initially chosen. Sampling rate is twice that of the individual channel and may require the same or an increased number of bits because of the reduced number of channels.

I claim:

1. A pulse code modulation system comprising:

a. a voice signal source;

b. a sequence of first band pass filters parallel fed by the signal source;

c. a sequence of baseband modulators fed one each by the sequence of band pass filters the baseband consisting of a frequency range starting with DC and having the same bandwidth as the first bandpass filters;

d. a sequence of baseband oscillators connected to one each of the sequence of baseband modulators, the oscillators having a preselected frequency for producing a baseband;

e. a first sequence of quadrature modulators fed by one each of the sequence of baseband modulators;

f. a plurality of orthogonal oscillator circuits, each circuit including a series connected oscillator and a 90° phase shifter and connecting the first sequence of the quadrature modulators into a plurality of pairs with a first quadrature modulator of each pair being connected to a second quadrature modulator one half of the sequence from the first quadrature modulator of the pair;

g. a sequence of second band pass filters fed by the outputs of the first sequence of quadrature modulators;

h. a plurality of third modulators fed by one each of the plurality of second band pass filters;
i. means for time sharing multiplexing fed by the plurality of third modulators;
j. an analog to digital converter fed by the time sharing multiplexing means;
k. means for transmitting the digital output signal of the analog to digital converter;
l. means for receiving the transmitted output;
m. a digital to analog converter fed by the receiving means;
n. means for time sharing demultiplexing fed by the digital to analog converter;
o. a plurality of fourth modulators fed by the time sharing demultiplexing means;
p. a sequence of third band pass filters fed by one each of the plurality of fourth modulators;
q. a second sequence of quadrature modulators fed by one each of the second plurality of band pass filters;
r. a second plurality of orthogonal circuits, each circuit including a series connected oscillator and a 90° phase shifter and connecting the second sequence of quadrature modulators into a plurality of pairs with a first quadrature modulator of each pair being connected to a second quadrature modulator one half of the sequence from the first quadrature modulator of the pair; and
s. means for converting the output of the second sequence of quadrature modulators to audio signals, the converting means including a sequence of audio modulators and a sequence of oscillators.

2. A pulse code modulation system according to claim 1 which further comprises:
a. a voice compressor fed by the signal source; and
b. a peak limiter interposed between the voice compressor and the sequence of band pass filters.

* * * * *